May 16, 1944. O. E. ESVAL ET AL 2,348,731
GYROSCOPIC CENTRALIZING AND CAGING DEVICE
Filed July 31, 1941 2 Sheets-Sheet 1

INVENTORS,
ORLAND E. ESVAL AND JOSEPH FREITAG,
BY Herbert H. Thompson
THEIR ATTORNEY May 16, 1944.　　　O. E. ESVAL ET AL　　　2,348,731
GYROSCOPIC CENTRALIZING AND CAGING DEVICE
Filed July 31, 1941　　　2 Sheets-Sheet 2

INVENTORS,
ORLAND E. ESVAL AND JOSEPH FRIETAG,
BY
Herbert H. Thompson
THEIR ATTORNEY Patented May 16, 1944

2,348,731

UNITED STATES PATENT OFFICE 2,348,731

GYROSCOPIC CENTRALIZING AND CAGING DEVICE

Orland E. Esval, Merrick, and Joseph Freitag, Jackson Heights, N. Y., assignors to Sperry Gyroscope Company, Inc., Brooklyn, N. Y., a corporation of New York Application July 31, 1941, Serial No. 404,758

1 Claim. (Cl. 74—5)

This invention relates to gyroscopes and particularly to a means by which instruments of this type may be centralized and caged. More specifically, this application contains matter divided from our prior joint application, Serial No. 235,566, for Gyroscopic direction indicating instruments, filed October 18, 1938, and hence is a continuation-in-part of said application.

One of the features of the present invention resides in the provision of a centrally positioned driving connection by means of which the respective spaced arms of the device are simultaneously and equally moved to so engage the pin extending from the casing of the gyroscopic element as to centralize and cage the same.

Another feature of the invention consists in the employment of straight pivotal arms for the centralizing and caging device which, when in an unused position, define a substantially square opening within the confines of which the cooperating pin of the gyroscope moves freely through the maximum range permitted by the positional arrangement of the pivotal axes of the arms.

Figure 1:
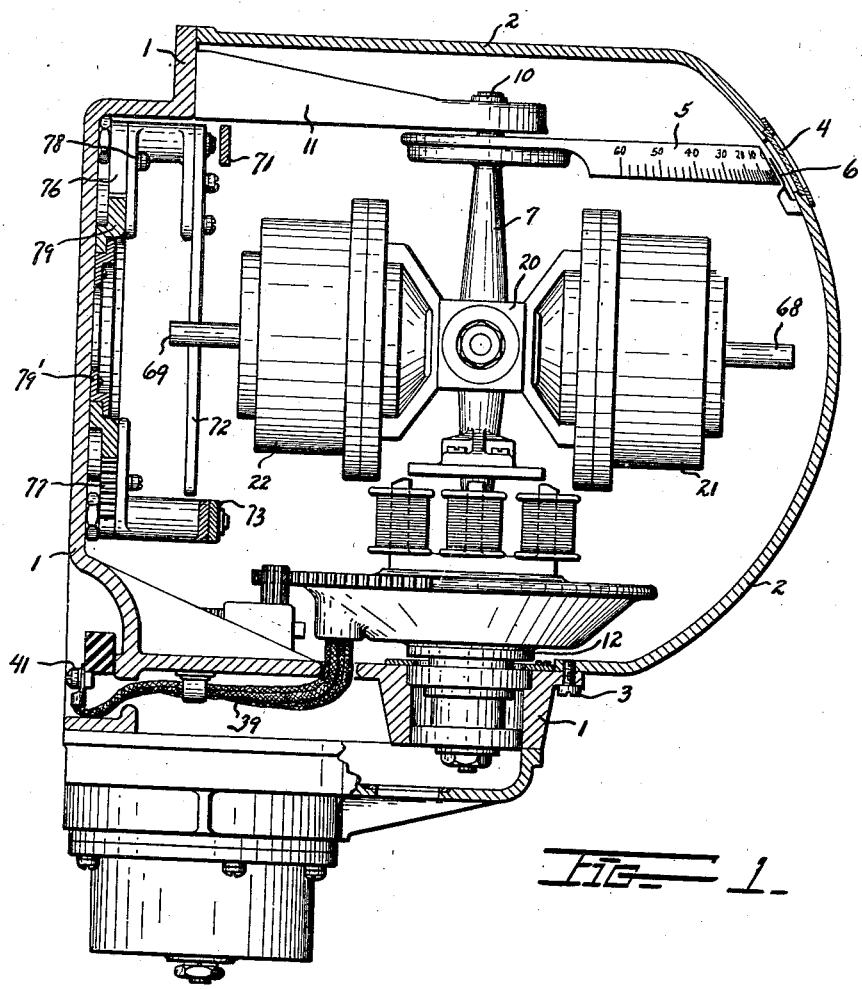

Other features and structural details of the invention will be apparent from the following description when read in connection with the accompanying drawings, wherein Fig. 1 is a partly sectionalized side elevation showing the improved centralizing and caging device in a form in which the same is embodied for use with a gyroscopic instrument of the direction indicating type. Such embodied use of the invention with this specific type of gyroscope is to be considered as illustrative only.

Figure 2:
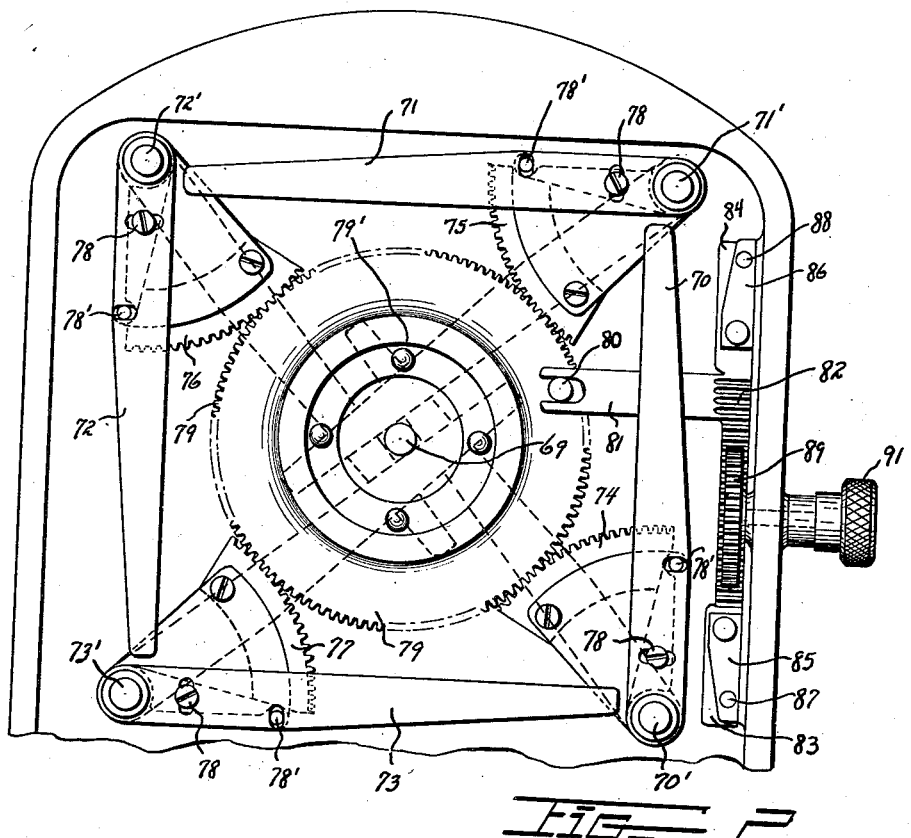

Fig. 2 is an enlarged front elevation illustrating, in detail, the preferred structural form of the novel centralizing and caging device.

Referring to Fig. 1, the illustratively employed directional gyroscope includes a base casing structure 1 which is suitably secured to the vehicle or craft on which the instrument is carried. A cover 2 secured by screws 3 serves to enclose the instrument and at the same time affords, through a window 4, a view of the dial 5 which swings around a substantially vertical axis and has an indicator 6 connected to the cover 2. In the construction shown, the dial 5 is in the form of a sector having marked graduations thereon providing a range of approximately 60 to 90 degrees. Dial 5 is carried by a vertical shaft 7 which is pivoted in an upper bearing and a lower bearing. A pivot 10 for the upper bearing is carried by a bracket 11 which is suitably fastened to the base structure 1, while the lower bearing is encased in a hub 12 which is suitably journaled in the base structure. A suitable thrust bearing may be employed to take the weight of the shaft 7 and the two gyroscopic elements situated thereon, in this instance.

To provide that the gyroscope elements tilt about a horizontal axis, the middle portion of the vertical shaft 7 carries two ball bearings which serve as journals for two adjustable conical pivots situated on a casting 20 which is so shaped as to form the end shells for the two gyroscopic housings 21 and 22. Screws or other suitable means are employed to connect the respective housings to the shell casting 20. The shell casting 20 has a central aperture through which the vertical shaft 7 extends, this portion of the casting being shaped in such a way as to allow a limited amount of freedom for the gyroscopic structure to tilt in a vertical plane. In the instrument shown in the drawings, the two housings 21 and 22 are identical and contain identical gyroscopic rotors with their respective driving stators.

Suitable provision is made to drive the gyroscopic rotors by means of alternating current of a desired high frequency, the current being supplied by way of flexible cable 39 and terminal block 41.

Each of the illustrated gyroscopic housings or casings 21 and 22 carries at its free end a pin 68 and 69, respectively. Pin 69 is employed in the instant case to provide a part of the improved centralizing and caging device, the same extending from the gyroscope instrument 22 and forming the element by means of which the gyroscope may be centralized and caged at a predetermined neutral position.

With reference also to Fig. 2, the devices cooperating with pin 69 for the purpose stated include a plurality of spaced pivotally mounted arms whose respective pivotal axes are situated at equal radial distances from the desired centralized position of the pin 69. Four arms as indicated at 70, 71, 72 and 73 are employed in the instant case, the respective posts or stub shafts on which the arms are mounted being designated at 70', 71', 72' and 73'. The shafts, in turn, are fixed in position in a suitable manner in the base casing structure 1. When the four arms are situated in unused position, as shown in the full line location thereof in Fig. 2, the same define a substantially square opening within the confines of which pin 69 moves freely through the maximum range or displacement of the gyroscope casing about both its horizontal and vertical axes permitted by the positional arrangement of the pivotal axes of the respective arms. In order to obtain such a range of movement of pin 69 within this portion of the centralizing and caging device, the inwardly disposed faces of the respective arms are made straight.

Further, the evenly spaced arms 70, 71, 72 and 73 are controlled by and operated with sector gear sleeve elements 74, 75, 76 and 77, respectively. Each of the arm and sector gear sleeve elements are adjustably mounted with respect to one another by means of a slot and screw connection such as designated at 78. When the correct setting of the adjustable parts is accurately determined, the same are then secured together by the use of dowel pins 78' or other suitable means for this purpose.

All four of the illustrated arms and the sector gear fastenings thereof are controlled by a centrally positioned driving connection in the form of gear 79 which is rotatably mounted on a flanged holding piece 79' fixed to base structure 1. The axis of the rotation of gear 79 is equidistant from each of the pivot forming stub shafts 70', 71', 72' and 73', and the gear meshes with the sectors so that the respective arms are simultaneously and equally moved to so engage the pin as to return it to the central position in which it is desired, as shown by the dash line position of the respective arms in Fig. 2. To avoid interference of the arms with one another during movement of the same to an operative position, oppositely disposed pairs of the arms are located in different planes. In this instance, arms 71 and 73 are situated in one plane and arms 72 and 70 in another, the planes being parallel and only slightly spaced apart.

Central gear 79 is operated manually through means of a pin 80 which is engaged in the slot of a movable arm 81. Arm 81 is secured to a gear rack 82 which is slidably mounted in two recesses under the bosses 83 and 84. The free ends of the gear rack 82 are milled flat and have detents into which springs 85 and 86 can press the loose pins 87 and 88 in such a way as to provide a definite rest for the rack at its two end positions. The rack itself is actuated by a gear 89 secured to a suitable shaft which is moved through means of a knob 91 situated exteriorly of the base casing or housing 1. When the knob 91 is turned through a suitable angle, the rack 82 for instance will slide from its inoperative end position to its operative end position, thereby urging the pin 80 to cause the gear 79 to revolve through a predetermined angle just sufficient to close the four arms 70, 71, 72 and 73 around pin 69, the arms being simultaneously and equally moved to so engage the pin as to centralize and cage the gyroscope. The length of the pin 69 and the opening defined by the four engaging arms therefore are so dimensioned that even at the maximum permitted angular displacement of the gyroscopic elements, the arms are able to effect contact with the pin to move the same to its caged position.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

In caging means for gyroscopes, the combination of, a casing, a gyro rotor bearing case mounted within said casing for pivotal movement about two mutually perpendicular axes, a pin on the gyro case, mechanism on said casing comprising a plurality of symmetrically spaced, pivotally mounted, arms whose respective pivotal axes are situated at equal radial distances from the caged position of the pin, a driving gear for each of the arms respectively mounted in coaxial relation therewith, an adjustable connection between each of the arms and its associated driving gear, a central gear meshing with the respective arm driving gears, and means for rotating said central gear to simultaneously and equally move the respective arms to engage the pin and thereby cage the case.

ORLAND E. ESVAL.
JOSEPH FREITAG.